US012580633B2

(12) United States Patent
Lee et al.

(10) Patent No.: US 12,580,633 B2
(45) Date of Patent: Mar. 17, 2026

(54) METHOD AND APPARATUS FOR CONTROLLING POWER OUTPUT FROM ELECTRONIC DEVICE TO EXTERNAL ELECTRONIC DEVICE IN A WIRELESS COMMUNICATION SYSTEM

(71) Applicant: Samsung Electronics Co., Ltd., Gyeonggi-do (KR)

(72) Inventors: Jaehyun Lee, Gyeonggi-do (KR); Youngjoon Kim, Gyeonggi-do (KR); Ilju Na, Gyeonggi-do (KR); Kitaek Bae, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 437 days.

(21) Appl. No.: 18/110,133

(22) Filed: Feb. 15, 2023

(65) Prior Publication Data

US 2024/0137105 A1     Apr. 25, 2024
US 2024/0235656 A9     Jul. 11, 2024

(30) Foreign Application Priority Data

Oct. 20, 2022    (KR) ......................... 10-2022-0135877

(51) Int. Cl.
*H04B 7/06*          (2006.01)
*H04B 7/145*         (2006.01)

(52) U.S. Cl.
CPC .................................... *H04B 7/145* (2013.01)

(58) Field of Classification Search
None
See application file for complete search history.

(56) References Cited

U.S. PATENT DOCUMENTS

| | | | | |
|---|---|---|---|---|
| 11,848,709 | B2 * | 12/2023 | Medra ................ | H04B 7/04013 |
| 12,191,973 | B2 * | 1/2025 | Gurelli ............... | H04B 7/04013 |
| 2023/0073398 | A1 * | 3/2023 | Raghavan .............. | H04B 7/026 |
| 2023/0107283 | A1 | 4/2023 | Park et al. | |
| 2023/0258759 | A1 * | 8/2023 | Wang .................... | G01S 1/0423 |
| | | | | 455/456.1 |
| 2024/0007176 | A1 | 1/2024 | Jeong et al. | |

FOREIGN PATENT DOCUMENTS

| | | |
|---|---|---|
| EP | 4 014 333 | 11/2021 |
| KR | 1020240002542 | 1/2024 |
| WO | WO 2021/056032 | 3/2021 |

(Continued)

OTHER PUBLICATIONS

Shaoe Lin et al., "Reconfigurable Intelligent Surfaces with Reflection Pattern Modulation: Beamforming Design and Performance Analysis", arXiv:2008.02555v1, Aug. 2020, 32 pg.

(Continued)

*Primary Examiner* — Minh Trang T Nguyen
(74) *Attorney, Agent, or Firm* — The Farrell Law Firm, P.C.

(57)          ABSTRACT

Disclosed is a method performed by a reconfigurable intelligent surface (RIS) device, the method including configuring a number of fixed beams for a beam, a fixed reflection pattern for the beam, and a fixed period for the beam; and reflecting a signal based on the number of the fixed beams, the fixed reflection pattern, and the fixed period, with the fixed reflection pattern being related to an amplitude and a phase of the reflected signal.

20 Claims, 16 Drawing Sheets

(56)　　　　　References Cited

FOREIGN PATENT DOCUMENTS

| WO | WO 2021/056034 | 3/2021 |
| WO | WO 2021/172631 | 9/2021 |
| WO | WO 2022/049112 | 3/2022 |
| WO | WO 2022/054985 | 3/2022 |
| WO | WO 2022/151128 | 7/2022 |
| WO | WO 2022/154456 | 7/2022 |

OTHER PUBLICATIONS

Mengnan Jian et al., "Reconfigurable Intelligent Surfaces for Wireless Communications: Overview of Hardware Designs, Channel Models, and Estimation Techniques", arXiv:2203.03176v1, Mar. 2022, 20 pages.
International Search Report dated Jun. 30, 2023 issued in counterpart application No. PCT/KR2022/016072, 11 pages.

* cited by examiner

| LTE | Payload contents | NR (MIB) | NR (additional payload) >6GHz | 3~6GHz | <3GHz | T-RIS |
|---|---|---|---|---|---|---|
| 3bits | Channel bandwidth | | | | | |
| 3bits | PHICH configuration | | | | | |
| 8 LSBs | System Frame Number (SFN) | 6 MSBs | 4 LSBs | | | |
| | MSB of SS/PBCH block index | | 3 bit | | | |
| | T-RIS index | | | | | 3 bit |
| | Half frame timing | 1 bit | 1 bit | 1 bit | | 1 bit |
| | SCS for common control | 1 bit | | | | |
| | SS/PBCH subcarrier offset | 4 bits | | 1 bit | 1 bit | |
| | DMRS Type A position for PDSCH | 1 bit | | | | |
| | SIB1 PDCCH configuration | 8 bits | | | | |
| | Cell barring info | 1 bit | | | | |
| | Intra frequency reselection | 1 bit | | | | |
| 10 bits | Spare → RIS indicator | 1 bit | | | | 1 bit |
| 24 bits | Total payload size | 23 bits + 1 bit (choice) | 8 bits | | | 8 bits |

METHOD AND APPARATUS FOR CONTROLLING POWER OUTPUT FROM ELECTRONIC DEVICE TO EXTERNAL ELECTRONIC DEVICE IN A WIRELESS COMMUNICATION SYSTEM

CROSS-REFERENCE TO RELATED APPLICATION(S)

This application is based on and claims priority under 35 U.S.C. § 119 to Korean Patent Application No. 10-2022-0135877, which was filed in the Korean Intellectual Property Office on Oct. 20, 2022, the entire disclosure of which is incorporated herein by reference.

BACKGROUND

1. Field

The disclosure relates generally to a wireless communication system and, more particularly, to a method and an apparatus for controlling power output from an electronic device to an external electronic device in a wireless communication system.

2. Description of the Related Art

Fifth generation (5G) mobile communication technologies define broad frequency bands such that high transmission rates and new services are possible, and can be implemented not only in sub 6 gigahertz (GHz) bands such as 3.5 GHz, but also in above 6 GHz" bands referred to as mmWave including 28 GHz and 39 GHz. In addition, it to implementation of sixth generation (6G) mobile communication technologies (referred to as beyond 5G systems) has been considered in terahertz (THz) bands (e.g., 95 GHz to 3 THz bands) to accomplish transmission rates up to fifty times faster than 5G mobile communication technologies and ultra-low latencies one-tenth of 5G mobile communication technologies.

Since the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been an ongoing standardization regarding beamforming and massive multi-input multi-output (MIMO) for mitigating radio-wave path loss and increasing radio-wave transmission distances in mmWave, supporting numerologies (e.g., operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio (NR) unlicensed (NR-U) aimed at system operations conforming to various regulation-related requirements in unlicensed bands, NR user equipment (UE) power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step random access channel (RACH) for NR). There also has been ongoing standardization in system architecture/service regarding a 5G baseline architecture (e.g., service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

SUMMARY

The disclosure has been made to address at least the above-mentioned problems and/or disadvantages and to provide at least the advantages described below.

An aspect of the disclosure is to provide an apparatus and a method for effectively providing a service in a wireless communication system.

According to an aspect of the disclosure, in a method performed by an RIS device in a wireless communication system is provided, the method including configuring a number of fixed beams for a beam, a fixed reflection pattern for the beam, and a fixed period for the beam; and reflecting a signal based on the number of fixed beams, the fixed reflection pattern, and the fixed period, with the fixed reflection pattern being related to an amplitude and a phase of the reflected signal.

According to another aspect of the disclosure, a method performed by the base station in a wireless communication system is provided, the method including identifying a number of fixed beams for a beam, a fixed reflection pattern for the beam, and a fixed period for the beam regarding a RIS device; and at least one of transmitting and receiving a signal based on the RIS, the number of fixed beams for a beam, a fixed reflection pattern for the beam, and a fixed period for the beam, with the fixed reflection pattern being related to an amplitude and a phase of the signal reflected by the RIS device.

According to a further aspect of the disclosure, in an RIS device in a wireless communication system is provided, the RIS device including an RIS element, and an RIS controller (RC) coupled to the RIS, wherein the RC may be configured to configure the number of fixed beams for a beam, a fixed reflection pattern for the beams, and a fixed period for the beams, and reflect a signal, based on the number of fixed beams, the fixed reflection pattern, and the fixed period, and wherein the fixed reflection pattern may be related to an amplitude and a phase of the signal reflected by the RIS device.

According to another aspect of the disclosure, a base station in a wireless communication system is provided, the base station including a transceiver and at least one processor coupled to the transceiver, with the at least one processor being configured to identify a number of fixed beams for a beam, a fixed reflection pattern for the beam, and a fixed period for the beam regarding a RIS device; and at least one of transmit and receive a signal based on the RIS, the number of fixed beams, the fixed reflection pattern, and the fixed period, with the fixed reflection pattern being related to an amplitude and a phase of the reflected signal.

BRIEF DESCRIPTION OF THE DRAWINGS

The above and other aspects, features, and advantages of certain embodiments will be more apparent from the following description taken in conjunction with the accompanying drawings, in which:

FIG. 12 illustrates information included in a physical broadcast channel (PBCH) according to an embodiment;

DETAILED DESCRIPTION

Figure 1:
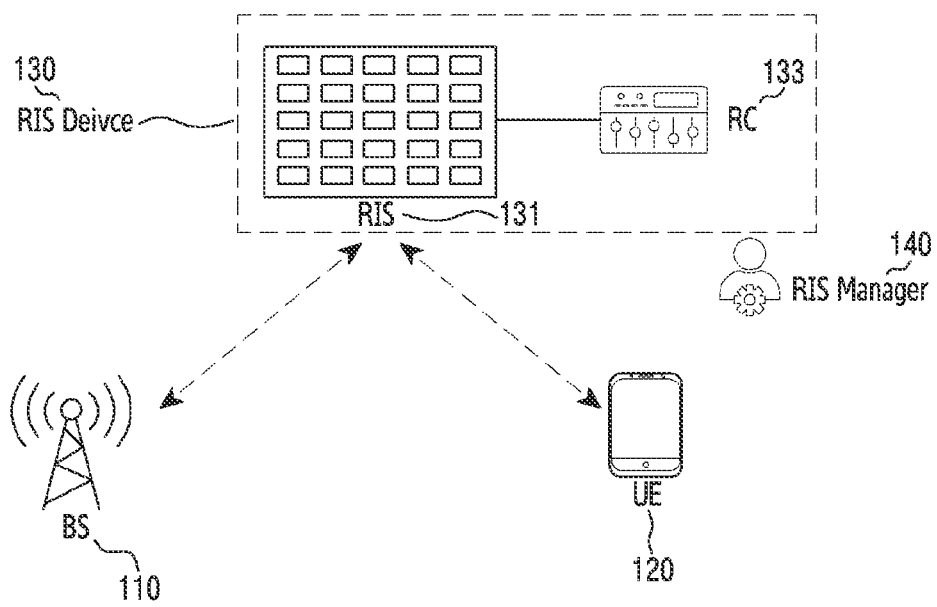
FIG. 1 illustrates a wireless communication environment according to an embodiment.

FIG. 1 illustrates an example of a wireless communication environment according to an embodiment. FIG. 1, as some of nodes using a radio channel in a wireless communication system, illustrates a base station 110, a UE 120, a RIS device 130, and an RIS manager 140. In addition, the RIS device 130 may include an RIS 131 and an RIS controller (RC) 133. Although FIG. 1 illustrates only one base station, other base stations identical or similar to the base station 110 may also be included.

The base station 110 is a network infrastructure that provides radio access to the UE 120. The base station 110 has coverage defined as a predetermined geographic area based on a distance at which a signal may be transmitted. In addition to the base station, the base station 110 may be referred to as access point (AP), an eNodeB (eNB), a 5th generation node (5G node), a 6th generation node (6G node), a wireless point, a transmission/reception point (TRP), or other terms having equivalent technical meaning.

The UE 120 is a device used by a user and communicates with the base station 110 through a radio channel. In some cases, the UE 120 may be operated without user involvement. That is, the UE 120 is a device that performs machine type communication (MTC) and may not be carried by a user. In addition, the UE 120 may be referred to as a UE, a mobile station, a subscriber station, customer premises equipment (CPE), a remote terminal, a wireless terminal, an electronic device, a user device, or other terms having equivalent technical meaning.

The base station 110 and the UE 120 may transmit and/or receive wireless signals in a mmWave band (e.g., 28 GHz, 30 GHz, 38 GHz, 60 GHz, over 60 GHz, etc.). In this case, to improve the channel gain, the base station 110 and the UE 120 may perform beamforming, including transmission beamforming and reception beamforming That is, the base station 110 and the UE 120 may provide directivity to a transmission signal and/or a reception signal. To this end, the base station 110 and the UE 120 may select serving beams through a beam search or beam management procedure. After the serving beams are selected, communication may be performed through a resource having a quasi co-located (QCL) relationship with a resource transmitting the serving beams.

When it is difficult for the UE 120 to directly transmit and receive radio signals to/from the base station 110 due to obstacles (e.g., trees, buildings, etc.), the UE 120 may reflect the signal transmitted from the base station 110 through the RIS device 130 and receive the indirectly. That is, the UE 120 may receive a reflection signal reflected by the RIS device 130. Here, the RIS device 130 may refer to a device including a plurality of reflection elements (REs), which may consider and include refraction.

Each RIS element of the RIS device 130 may configure a phase and an amplitude of a signal to be reflected. For example, the RIS device 130 may configure specific values for the phase and amplitude of a signal received from the base station 110 based on each RE. In this case, a combination of the phase and the amplitude of the signal that is to be adjusted by the specific value may be referred to as a reflection pattern. That is, the RIS device 130 may adjust the phase and amplitude of the signal received from the base station 110, based on the reflection pattern. The reflection pattern may include a refraction pattern. According to an embodiment, the RIS controller 133 included in the RIS device 130 may configure the phase and amplitude of a signal to be reflected for each RE.

The phase and amplitude of the RIS device 130 may be configured by the RIS manager 140. For example, the RIS device 130 may receive configuration information from the RIS manager 140 and determine the phase and amplitude based thereon.

The RIS device 130 may be operated based on a plurality of reflection patterns. For example, a first reflection pattern among a plurality of reflection patterns may be applied to a plurality of REs included in the RIS device 130. The RIS device 130 to which the first reflection pattern is applied may reflect the signal received from the base station 110 as a signal having a first reflection characteristic. Herein, reflecting with a signal having reflection characteristics may refer to changing the characteristic of the received signal and reflecting the signal as it is, or may refer to generating a new signal based on the characteristic of the received signal and a reflection pattern (reflection phase and reflection amplitude) to be adjusted and transmitting the signal. In addition, when a second reflection pattern different from the first reflection pattern among the plurality of reflection patterns is applied to the RIS device 130, the second reflection pattern may be applied to a plurality of REs included in the RIS device 130. In this case, the RIS device 130 may reflect a signal having a different characteristic from a signal reflected by the first reflection pattern. That is, by the RIS device 130 to which the second reflection pattern is applied, a signal having a second reflection characteristic may be reflected. A plurality of reflection patterns may be included in one RIS beambook.

The RIS device 130 may determine a specific reflection pattern and a time period during which the specific reflection pattern is maintained (referred to herein as a reflection pattern period) to reflect the signal received from the base station 110 and transmit the reflected signal to the UE 120. The reflection pattern and the reflection pattern period of the RIS device 130 may be configured by the RIS manager 140. For example, the RIS device 130 may receive configuration information from the RIS manager 140 and determine the reflection pattern and the reflection pattern period based on the configuration information. Determining the reflection pattern may refer to that one of reflection patterns of a specific RIS beambook is selected and used to reflect a signal.

As described above, the UE 120 that may not directly receive a signal from the base station 110 due to an obstacle may maintain communication by receiving a signal reflected by the RIS device 130.

Figure 2:
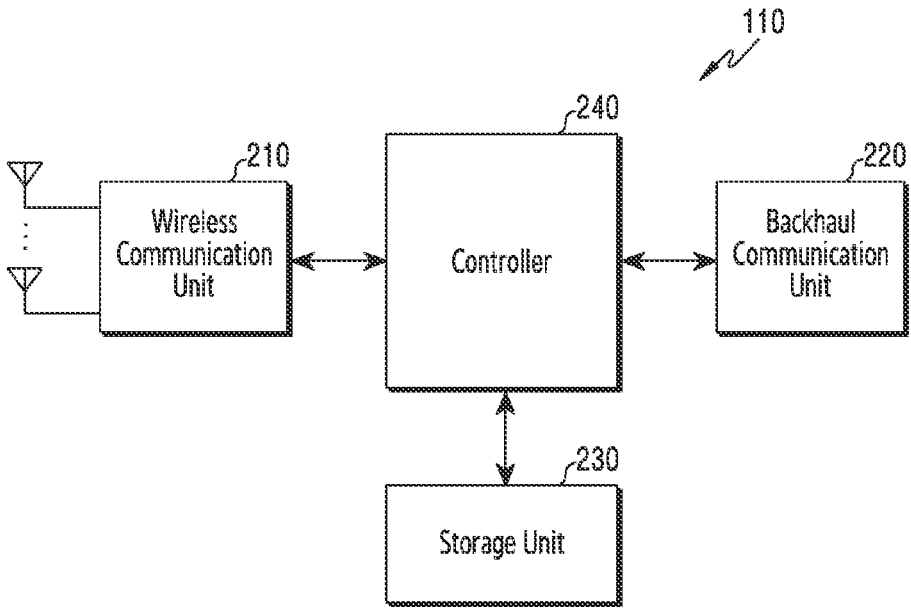
FIG. 2 illustrates a configuration of a base station in a wireless communication system according to an embodiment.

FIG. 2 illustrates a configuration of a base station in a wireless communication system according to an embodiment. The configuration illustrated in FIG. 2 may be understood as a configuration of the base station 110. Terms such as unit, etc., may refer to a unit that processes at least one function or operation, which may be implemented by hardware or software, or a combination of hardware and software.

Referring to FIG. 2, the base station 110 may include a wireless communication unit 210, a backhaul communication unit 220, a storage unit 230, and a controller 240.

The wireless communication unit 210 performs functions for transmitting and receiving signals through a radio channel. The wireless communication unit 210 performs a conversion function between a baseband signal and a bit string according to the physical layer standard of the system. For example, when transmitting data, the wireless communication unit 210 generates complex symbols by encoding and modulating a transmission bit string. In addition, when receiving data, the wireless communication unit 210 restores the received bit string through demodulation and decoding of the baseband signal. In addition, the wireless communication unit 210 up-converts the baseband signal into a radio frequency (RF) band signal, transmits the signal through an antenna, and down-converts the RF band signal received through the antenna into a baseband signal.

To this end, the wireless communication unit 210 may include a transmission filter, a reception filter, an amplifier, a mixer, an oscillator, a digital to analog converter (DAC), an analog to digital converter (ADC), and the like. In addition, the wireless communication unit 210 may include a plurality of transmission and reception paths. The wireless communication unit 210 may also include at least one antenna array composed of a plurality of antenna elements. In terms of hardware, the wireless communication unit 210 may be composed of a digital unit and an analog unit, and the analog unit may be composed of a plurality of sub-units according to operating power, operating frequency, and the like.

The wireless communication unit 210 is configured to transmit and receive signals. To this end, the wireless communication unit 210 may include at least one transceiver. For example, the wireless communication unit 210 may transmit a synchronization signal, a reference signal, system information, a message, control information, data, and the like. In addition, the wireless communication unit 210 may perform beamforming.

The wireless communication unit 210 transmits/receives signals, as described above. All or part of the wireless communication unit 210 may be referred to as a transmitter, a receiver or a transceiver. In addition, transmission and reception performed through a radio channel are used to refer to processing performed by the wireless communication unit 210.

The backhaul communication unit 220 provides an interface for communicating with other nodes in a network. That is, the backhaul communication unit 220 converts a bit string transmitted from the base station 110 to another node (e.g., another access node, another base station, an upper node, a core network, etc.) into a physical signal, and converts the bit string received from the other node into a bit string.

The storage unit 230 stores data such as a basic program, an application program, and configuration information for operation of the base station 110. The storage unit 230 may include a memory, which may be a volatile memory, a non-volatile memory, or a combination of volatile and non-volatile memories. In addition, the storage unit 230 provides the stored data according to the request of the controller 240. The storage unit 230 may store learning data for AI-based CSI feedback and apply the stored learning data to a neural network structure of AI-based CSI feedback.

The controller 240 controls overall operations of the base station 110. For example, the controller 240 transmits/receives signals through the wireless communication unit 210 or the backhaul communication unit 220. In addition, the controller 240 writes and reads data in the storage unit 230. The controller 240 may also perform functions of a protocol stack required by communication standards. To this end, the controller 240 may include at least one processor.

The configuration of the base station 110, as illustrated in FIG. 2, is only one example of a base station, and the examples of the base station performing various embodiments are not limited from the configuration illustrated in FIG. 2. That is, according to various embodiments, some configurations may be added, deleted, or changed.

Although the base station is described as one entity in FIG. 2, the disclosure is not limited thereto. Base stations according to various embodiments may be implemented to configure an access network having a distributed deployment as well as an integrated deployment. The base station may be divided into a central unit (CU) and a digital unit (DU). The CU may be configured to perform an upper layer function (e.g., packet data convergence protocol (PDCP) and radio resource control (RRC)). The DU may be configured to perform a lower layer function (e.g., medium access control (MAC) and physical (PHY) layer). The DU of the base station may form beam coverage on a radio channel.

Figure 3:
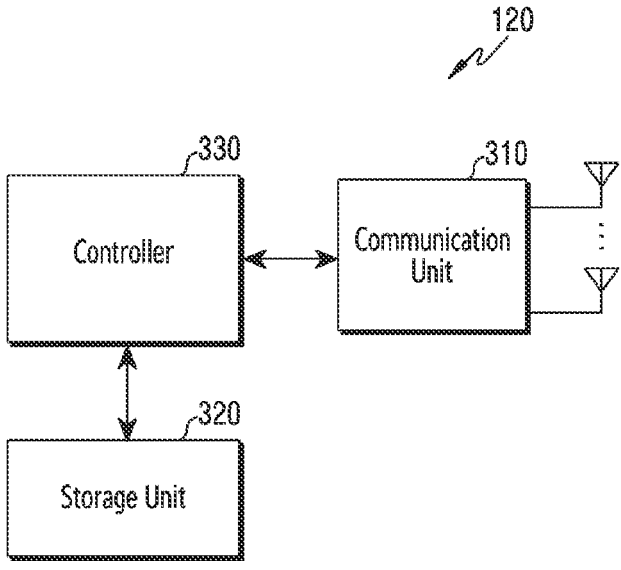
FIG. 3 illustrates a configuration of a terminal in a wireless communication system according to an embodiment.

FIG. 3 illustrates a configuration of a terminal in a wireless communication system according to an embodiment. The configuration illustrated in FIG. 3 may be understood as a configuration of the UE 120. Referring to FIG. 3, the UE 120 may include a communication unit 310, a storage unit 320, and a controller 330.

The communication unit 310 performs functions for transmitting and receiving signals through a radio channel. For example, the communication unit 310 performs a conversion function between a baseband signal and a bit string according to the physical layer standard of the system. When transmitting data, the communication unit 310 generates complex symbols by encoding and modulating a transmission bit string. In addition, when receiving data, the communication unit 310 restores the received bit string through demodulation and decoding of the baseband signal. In addition, the communication unit 310 up-converts the baseband signal into an RF band signal, transmits the signal through an antenna, and down-converts the RF band signal received through the antenna into a baseband signal. The communication unit 310 may include a transmission filter, a reception filter, an amplifier, a mixer, an oscillator, a DAC, an ADC, and the like.

The communication unit 310 may also include a plurality of transmission and reception paths. In addition, the communication unit 310 may include an antenna unit. The communication unit 310 may include at least one antenna array composed of a plurality of antenna elements. In terms of hardware, the communication unit 310 may include a digital circuit and an analog circuit (e.g., a radio frequency integrated circuit (RFIC)). Here, the digital circuit and the analog circuit may be implemented in one package. The communication unit 310 may include multiple RF chains. The communication unit 310 may perform beamforming. The communication unit 310 may apply a beamforming weight to the signal to give a directionality according to the configuration of the controller 330 to the signal to be transmitted/received. The communication unit 310 may include a an RF block (or RF unit). The RF block may include a first RF circuitry related to an antenna and a second RF circuitry related to baseband processing. The first RF circuit may be referred to as RF-A (antenna). The second RF circuit may be referred to as RF-B (baseband).

The communication unit 310 may transmit and receive signals, and may include at least one transceiver. The communication unit may include at least one transceiver. The downlink signal may include a synchronization signal (SS), a reference signal (RS) (e.g., cell-specific reference signal (CRS) and demodulation (DM)-RS), system information (e.g., master information block (MIB), system information block (SIB), remaining system information (RMSI), and other system information (OSI)), a configuration message, control information, or downlink data and the like. The communication unit 310 may also transmit an uplink signal. The uplink signal may include a random access related signal (e.g., random access preamble (RAP) (or message 1 (Msg1)) and message 3 (Msg3)), a reference signal (e.g., sounding reference signal (SRS) and DM-RS), or power headroom report (PHR), and the like.

The communication unit 310 may include different communication modules to process signals of different frequency bands. The communication unit 310 may also include a plurality of communication modules to support a plurality of different radio access technologies. For example, the different radio access technologies may include Bluetooth™ low energy (BLE), wireless fidelity (Wi-Fi), Wi-Fi gigabyte (WiGig), cellular networks (e.g., long term evolution (LTE) and NR), and the like. In addition, the different frequency bands may include a super high frequency (SHF) (e.g., 2.5 GHz and 5 GHz) band and a millimeter wave (e.g., 38 GHz, 60 GHz, etc.) band. In addition, the communication unit 310 may use the same radio access technology on different frequency bands (e.g., unlicensed band for licensed assisted access (LAA) and citizens broadband radio service (CBRS) (e.g., 3.5 GHz)).

The communication unit 310 transmits and receives signals, as described above, and all or part of the communication unit 310 may be referred to as a transmitter, a receiver or a transceiver. In addition, transmission and reception performed through a radio channel are used to refer to that the above-described processing is performed by the communication unit 310.

The storage unit 320 stores data such as a basic program, an application program, and configuration information for operation of the UE 120. The storage unit 320 may be composed of a volatile memory, a non-volatile memory, or a combination of volatile and non-volatile memories. In addition, the storage unit 320 provides the stored data according to the request of the controller 330. The storage unit 320 may store learning data for AI-based CSI feedback according to a feedback format configured by the base station.

The controller 330 controls overall operations of the UE 120. For example, the controller 330 transmits/receives signals through the communication unit 310. In addition, the controller 330 writes and reads data in the storage unit 320. In addition, the controller 330 may perform functions of a protocol stack required by communication standards. To this end, the controller 330 may include at least one processor, or microprocessor, or may be a part of the processor. In addition, a part of the communication unit 310 and the controller 330 may be referred to as a communication processor (CP). The controller 330 may include various modules for performing communication. The controller 330 may control the terminal to perform operations according to various embodiments. The configuration of the UE 120 illustrated in FIG. 3 is only one example of a terminal, and the examples of the terminal performing various embodiments are not limited from the configuration illustrated in FIG. 3. That is, according to various embodiments, some configurations may be added, deleted, or changed.

Figure 4:
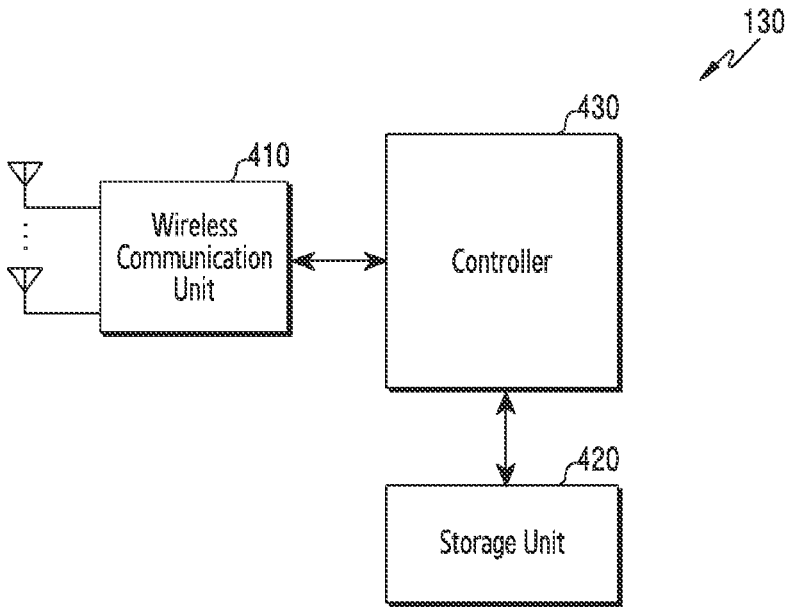
FIG. 4 illustrates a configuration of a RIS device in a wireless communication system according to an embodiment.

FIG. 4 illustrates a configuration of a RIS device in a wireless communication system according to an embodiment. The configuration illustrated in FIG. 4 may be understood as a configuration of the RIS device 130.

Referring to FIG. 4, the RIS device 130 may include a wireless communication unit 410, a storage unit 420, and a controller 430.

The wireless communication unit 410 may include a plurality of REs. Based on the plurality of REs, the wireless communication unit 410 may reflect the signal. In the case of reflection, the amplitude and phase of the received signal may be adjusted by a specific value. A combination of the amplitude and phase of a signal to be adjusted by the specific value may be referred to as a reflection pattern.

The storage unit 420 stores data such as a basic program, an application program, and configuration information for operation of the RIS device 130. The storage unit 420 may include a memory, which may be a volatile memory, a non-volatile memory, or a combination of volatile and non-volatile memories. In addition, the storage unit 420 provides the stored data according to the request of the controller 430. The storage unit 420 may previously store information on a plurality of reflection patterns applied to the RIS device 130 (i.e., an RIS beambook).

The controller 430 controls overall operations of the RIS device 130. For example, the controller 430 controls the reflection of a signal through the wireless communication unit 420. In addition, the controller 430 writes and reads data in the storage unit 420. To this end, the controller 430 may include at least one processor.

The configuration of the RIS device 130 illustrated in FIG. 4 is only one example of an RIS device, and the examples of the RIS device performing various embodiments are not limited from the configuration illustrated in FIG. 4. That is, according to various embodiments, some configurations may be added, deleted, or changed.

Figure 5:
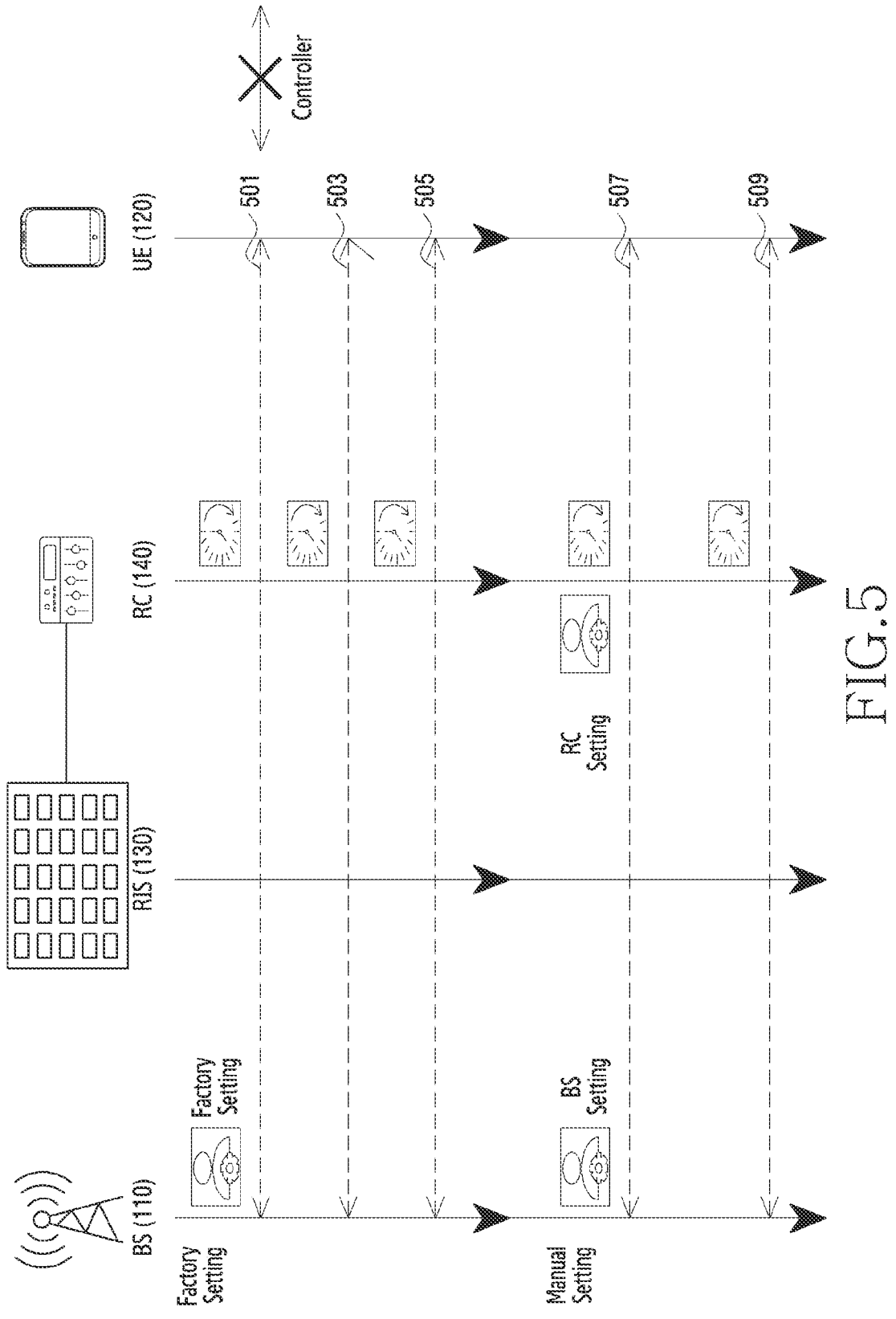
FIG. 5 illustrates data transmission and reception between a base station and a terminal through an RIS device according to an embodiment.

FIG. 5 illustrates data transmission and reception between a base station and a terminal through an RIS device according to an embodiment.

Referring to FIG. 5, in steps 501, 503, 505, 507, and 509, the base station 110 may transmit and receive signals to/from the UE 120 through the RIS device 130. In steps 501, 503, 505, 507, and 509, the base station 110 does not transmit and receive a reference signal or a control signal to/from the RIS device 130. In steps 501, 503, 505, 507, and 509, the base station 110 may transmit and receive signals to/from the UE 120 through the RIS device 130 without transmitting and receiving a reference signal or a control signal to/from the RIS device 130. Instead of transmitting and receiving a reference signal or a control signal to/from the base station 110, the RIS device 130 may allow the base station 110 and the UE 120 to transmit and receive signals through the RIS device 130 by performing only fixed configuration for the beam, with the fixed configurations for the beam being further described in FIG. 6.

Figure 6:
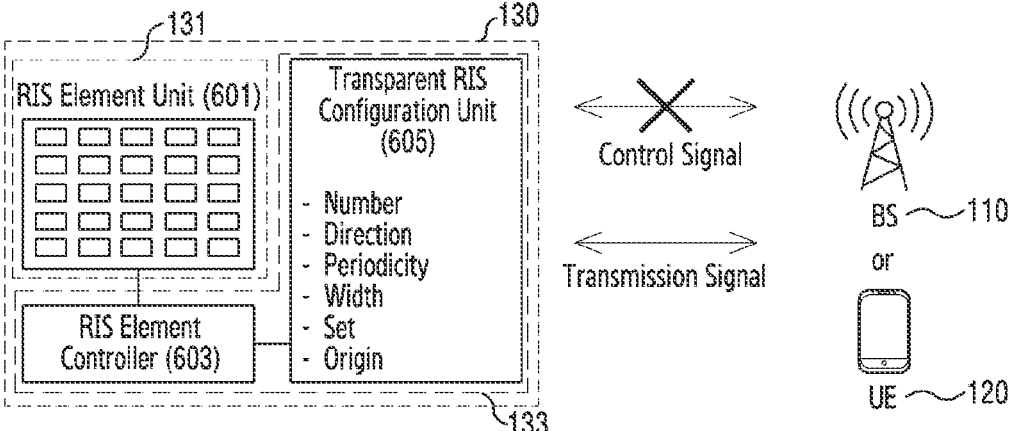
FIG. 6 illustrates a network environment including an RIS device according to an embodiment.

FIG. 6 illustrates a network environment including an RIS device according to an embodiment.

FIG. 6 illustrates that the RIS device 130 includes an RIS element unit 601, an RIS element controller 603 connected to the RIS element unit 601, and an RIS configuration unit 605 connected to the RIS element controller 603.

When it is difficult for the UE 120 to directly transmit and receive a wireless signal to/from the base station 110 due to an obstacle, the UE 120 may reflect the radio signal through the RIS device 130 and receive the signal indirectly. When the base station 110 transmits indirectly by reflection through the RIS device 130, the base station 110 may reflect and transmit a reference signal or a control signal through the RIS device 130, without the RIS device 130 transmitting and receiving a reference signal or a control signal to/from the base station 110.

The RIS element unit 601 may include elements constituting an RIS device, and the RIS element unit 601 may include one or more metamaterial unit cells.

The RIS element controller 603 may control a signal passing through the RIS device, and may control the amplitude of a signal passing through the RIS device. The RIS element controller 603 may also control the phase of a signal passing through the RIS device.

The RIS configuration unit 605 may perform initial configurations for an RIS device. The base station 110 may reflect and transmit through the RIS device 130 only through RIS configuration without the RIS device 130 transmitting and receiving reference signals or control signals to/from the base station 110. The initial configurations for an RIS device may be fixed, and may be received from the RIS manager 140. The RIS 131 of FIG. 1 corresponds to the RIS element unit 601. The RIS controller 133 of FIG. 1 corresponds to the RIS element controller 603 and the RIS configuration unit 605.

Instead of the RIS device 130 transmitting and receiving a reference signal or a control signal to/from the base station 110 and identifying a set of beams based thereon, the RIS device 130 for which the RIS configuration unit 605 configures a set of beams to be fixed may be referred to as a transparent RIS (T-RIS).

The RIS configuration unit 605 may configure the number of reflected beams, which may be a fixed value. For example, instead of the RIS device 130 transmitting and receiving a reference signal or control signal with the base station 110 and identifying the number of reflected beams based thereon, the RIS configuration unit 605 may configure the number of reflected beams to be fixed. Because the number of configured beams is fixed, the RIS device 130 does not transmit and receive a reference signal or a control signal to/from the base station 110. Thus, the RIS device 130 does not need to include a signal processor that processes an RIS reference signal or an RIS control signal. In other words, the RIS device 130 does not need to include an RIS synchronization unit for transmitting and receiving a reference signal or a control signal to/from the base station 110, an RIS reference signal receiver or an RIS control signal receiver, an RIS reference signal generator or an RIS control signal generator, and an RIS reference signal transmitter or an RIS control signal transmitter. Because the RIS device does not include a signal processor for processing an RIS reference signal or an RIS control signal, the structure of the RIS device may be simplified and the cost to implement the RIS device may be reduced.

The RIS configuration unit 605 may configure a reflection pattern of a beam, which may be a reflection pattern related to the amplitude of a signal reflected by the RIS device. For example, the reflection pattern of the beam may be a reflection pattern related to the phase of a signal reflected by the RIS device. The reflection pattern of the beam may be a fixed reflection pattern. For example, instead of the RIS device 130 transmitting and receiving a reference signal or a control signal to/from the base station 110 and identifying a reflection pattern of the beam based thereon, the RIS configuration unit 605 may configure the reflection pattern of the beam to be fixed. Because the reflection pattern of configured beams is fixed, the RIS device 130 for identifying the reflection pattern of the beam does not transmit and receive a reference signal or a control signal to/from the base station 110. Thus, the RIS device 130 does not need to include a signal processor that processes an RIS reference signal or an RIS control signal. In other words, the RIS device 130 does not need to include an RIS synchronization unit for transmitting and receiving a reference signal or a control signal to/from the base station 11, an RIS reference signal receiver or an RIS control signal receiver, an RIS reference signal generator or an RIS control signal generator, and an RIS reference signal transmitter or an RIS control signal transmitter. Because the RIS device does not include a signal processor for processing an RIS reference signal or an RIS control signal, the structure of the RIS device may be simplified and the cost to implement the RIS device may be reduced.

The RIS configuration unit 605 may configure a direction of a beam, which may be the fixed direction according to an embodiment. For example, instead of the RIS device 130 transmitting and receiving a reference signal or a control signal to/from the base station 110 and identifying a direction of the beam based thereon, the RIS configuration unit 605 may configure the direction of the beam to be fixed. Because the direction of configured beams is fixed, the RIS device 130 for identifying the direction of the beam does not transmit and receive a reference signal or a control signal to/from the base station 110. Thus, the RIS device 130 does not need to include a signal processor that processes an RIS reference signal or an RIS control signal. In other words, the RIS device 130 does not need to include an RIS synchronization unit for transmitting and receiving a reference signal or a control signal to/from the base station 110, an RIS reference signal receiver or an RIS control signal receiver, an RIS reference signal generator or an RIS control signal generator, and an RIS reference signal transmitter or an RIS control signal transmitter. Because the RIS device does not include a signal processor for processing an RIS reference signal or an RIS control signal, the structure of the RIS device may be simplified and the cost to implement the RIS device may be reduced.

The RIS configuration unit 605 may configure a width of a beam, which may be a fixed width according to an embodiment. For example, instead of the RIS device 130 transmitting and receiving a reference signal or a control signal to/from the base station 110 and identifying a width of the beam based thereon, the RIS configuration unit 605 may configure the width of the beam to be fixed. Because the width of configured beams is fixed, the RIS device 130 for identifying the width of the beam does not transmit and receive a reference signal or a control signal to/from the base station 110. Thus, the RIS device 130 does not need to include a signal processor that processes an RIS reference signal or an RIS control signal. In other words, the RIS device 130 does not need to include an RIS synchronization unit for transmitting and receiving a reference signal or a control signal to/from the base station 11, an RIS reference signal receiver or an RIS control signal receiver, an RIS reference signal generator or an RIS control signal generator, and an RIS reference signal transmitter or an RIS control signal transmitter. Because the RIS device does not include a signal processor for processing an RIS reference signal or an RIS control signal, the structure of the RIS device may be simplified and the cost to implement the RIS device may be reduced.

The RIS configuration unit 605 may configure a periodicity of a beam, which may be a fixed periodicity according to an embodiment. For example, instead of the RIS device 130 transmitting and receiving a reference signal or a control signal to/from the base station 110 and identifying a periodicity of the beam based thereon, the RIS configuration unit 605 may configure the periodicity of the beam to be fixed. Because the periodicity of configured beams is fixed, the RIS device 130 for identifying the periodicity of the beam does not transmit and receive a reference signal or a control signal to/from the base station 110. Thus, the RIS device 130 does not need to include a signal processor that processes an RIS reference signal or an RIS control signal. In other words, the RIS device 130 does not need to include an RIS synchronization unit for transmitting and receiving a reference signal or a control signal to/from the base station 11, an RIS reference signal receiver or an RIS control signal receiver, an RIS reference signal generator or an RIS control signal generator, and an RIS reference signal transmitter or an RIS control signal transmitter. Because the RIS device does not include a signal processor for processing an RIS reference signal or an RIS control signal, the structure of the RIS device may be simplified and the cost to implement the RIS device may be reduced.

The RIS configuration unit 605 may configure a set of a beam, which may be a fixed set according to an embodiment. For example, instead of the RIS device 130 transmitting and receiving a reference signal or a control signal to/from the base station 110 and identifying a set of the beam based thereon, the RIS configuration unit 605 may configure the set of the beam to be fixed. Because the set of configured beams is fixed, the RIS device 130 for identifying the set of the beam does not transmit and receive a reference signal or a control signal to/from the base station 110. Thus, the RIS device 130 does not need to include a signal processor that processes an RIS reference signal or an RIS control signal. In other words, the RIS device 130 does not need to include an RIS synchronization unit for transmitting and receiving a reference signal or a control signal to/from the base station 11, an RIS reference signal receiver or an RIS control signal receiver, an RIS reference signal generator or an RIS control signal generator, and an RIS reference signal transmitter or an RIS control signal transmitter. Because the RIS device does not include a signal processor for processing an RIS reference signal or an RIS control signal, the structure of the RIS device may be simplified and the cost to implement the RIS device may be reduced.

The RIS configuration unit 605 may configure a origin of the RIS device 130 to the base station. The origin of the RIS device 130 to the base station may be a fixed origin according to an embodiment. For example, instead of the RIS device 130 transmitting and receiving a reference signal or a control signal to/from the base station 110 and identifying a direction of the beam based thereon, the RIS configuration unit 605 may configure the origin of the RIS device 130 to the base station to be fixed. Because the configured origin of the RIS device 130 to the base station is fixed, the RIS device 130 for identifying the origin of the RIS device 130 to the base station does not transmit and receive a reference signal or a control signal to/from the base station 110. Thus, the RIS device 130 does not need to include a signal processor that processes an RIS reference signal or an RIS control signal. In other words, the RIS device 130 does not need to include an RIS synchronization unit for transmitting and receiving a reference signal or a control signal to/from the base station 11, an RIS reference signal receiver or an RIS control signal receiver, an RIS reference signal generator or an RIS control signal generator, and an RIS reference signal transmitter or an RIS control signal transmitter.

Because the RIS device does not include a signal processor for processing an RIS reference signal or an RIS control signal, the structure of the RIS device may be simplified and the cost to implement the RIS device may be reduced.

Instead of the RIS device 130 transmitting and receiving a reference signal or a control signal to/from the base station 110 and identifying a pattern of the beam based thereon, the RIS configuration unit 605 may configure the pattern of the RIS device 130 to the base station to be fixed. In this case, because the RIS device 130 does not transmit and receive a reference signal or a control signal to/from the base station 110, a case may occur in which synchronization is not matched, as described in FIG. 7.

Figure 7:
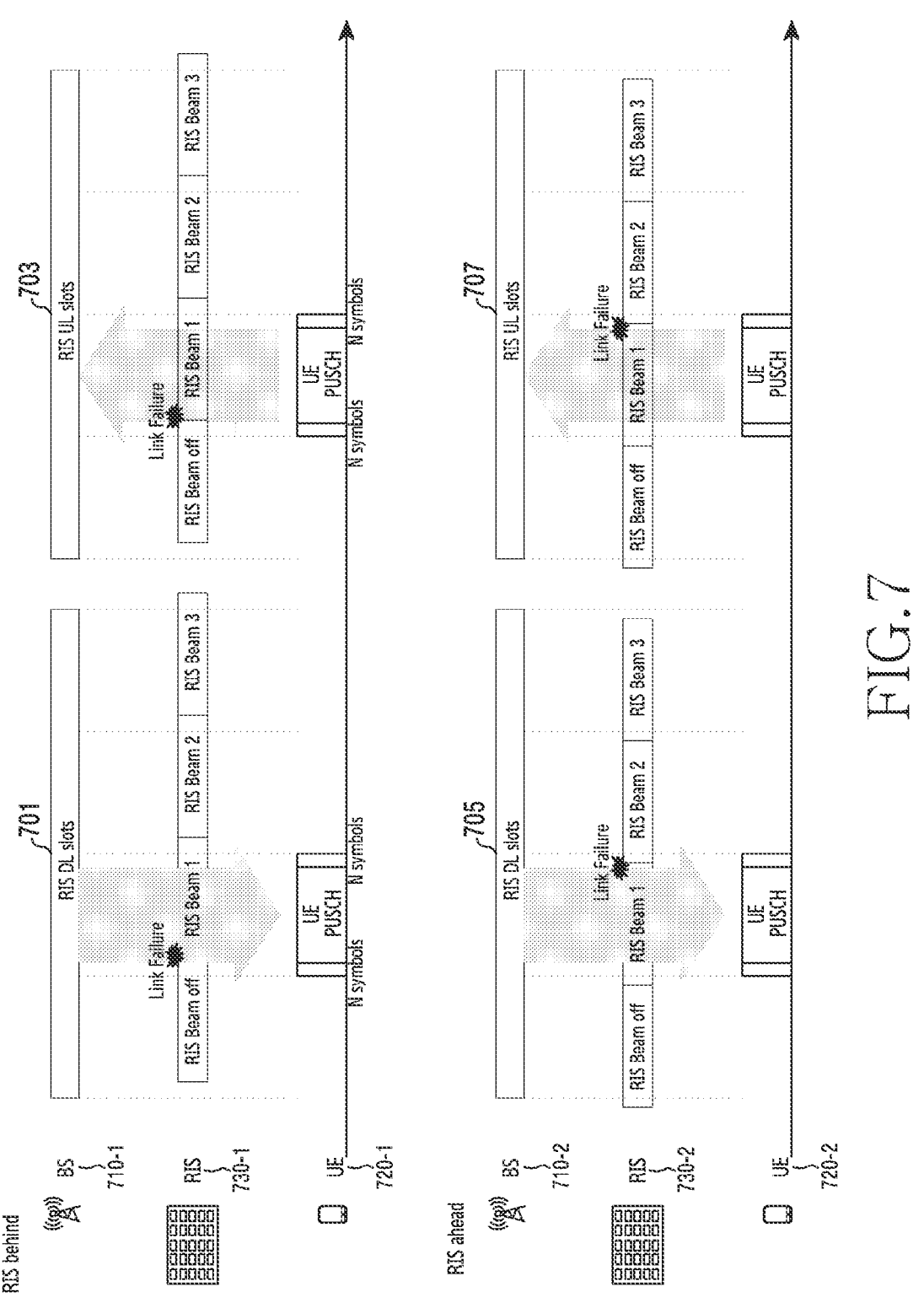
FIG. 7 illustrates data transmission and reception between a base station and a terminal through an RIS device according to an embodiment.

FIG. 7 illustrates another example of data transmission and reception between a base station and a terminal through an RIS device according to an embodiment.

Referring to FIG. 7, in situation 701, a first base station 710-1 may transmit a signal to a first terminal 720-1 through a first RIS device 730-1. Situation 701 of FIG. 7 illustrates a slot boundary of the first RIS device 730-1 being behind a slot boundary of the first base station 710-1. The slot boundary of the first RIS device 730-1 is behind due to the synchronization between the first RIS device 730-1 and the first base station 710-1 not matching because the first RIS device 730-1 does not transmit and receive a reference signal or a control signal to/from the first base station 710-1 after an initial configuration for the first RIS device 730-1.

Situation 703 of FIG. 7 illustrates the first terminal 720-1 transmitting a signal to the first base station 710-1 through the first RIS device 730-1, with the slot boundary of the first RIS device 730-1 being behind the slot boundary of the first terminal 720-1. The slot boundary of the first RIS device 730-1 is behind due to the synchronization between the first RIS device 730-1 and the first terminal 720-1 not matching because the first RIS device 730-1 does not transmit and receive a reference signal or a control signal to/from the first terminal 720-1 after the initial configuration for the first RIS device 730-1.

Situation 705 of FIG. 7 illustrates a second base station 710-2 transmitting a signal to a second terminal 720-2 through a second RIS device 730-2, with the slot boundary of the second RIS device 730-2 being ahead of the slot boundary of the second base station 710-2. The slot boundary of the second RIS device 730-2 is ahead due to the synchronization between the second RIS device 730-2 and the second base station 710-2 not matching because the second RIS device 730-2 does not transmit and receive a reference signal or a control signal to/from the second base station 710-2 after the initial configuration for the second RIS device 730-2.

Situation 707 of FIG. 7 illustrates a second terminal 720-2 transmitting a signal to a second base station 710-2 through a second RIS device 730-2, with the slot boundary of the second RIS device 730-2 being ahead of the slot boundary of the second terminal 720-2. The slot boundary of the second RIS device 730-2 is ahead due to the synchronization between the second RIS device 730-2 and the second terminal 720-2 not matching because the second RIS device 730-2 does not transmit and receive a reference signal or a control signal to/from the second terminal 720-2 after the initial configuration for the second RIS device 730-2.

In situations 701, 703, 705, and 707 of FIG. 7, when the slot boundary of the RIS device 130 and the slot boundary of the base station 110 or UE 120 does not match, data may not be transmitted or received, creating a problem due to boundary mismatch. A method for solving the problem of data not being transmitted/received due to the boundary mismatch is described with reference to FIGS. 8 to 16.

Figure 8:
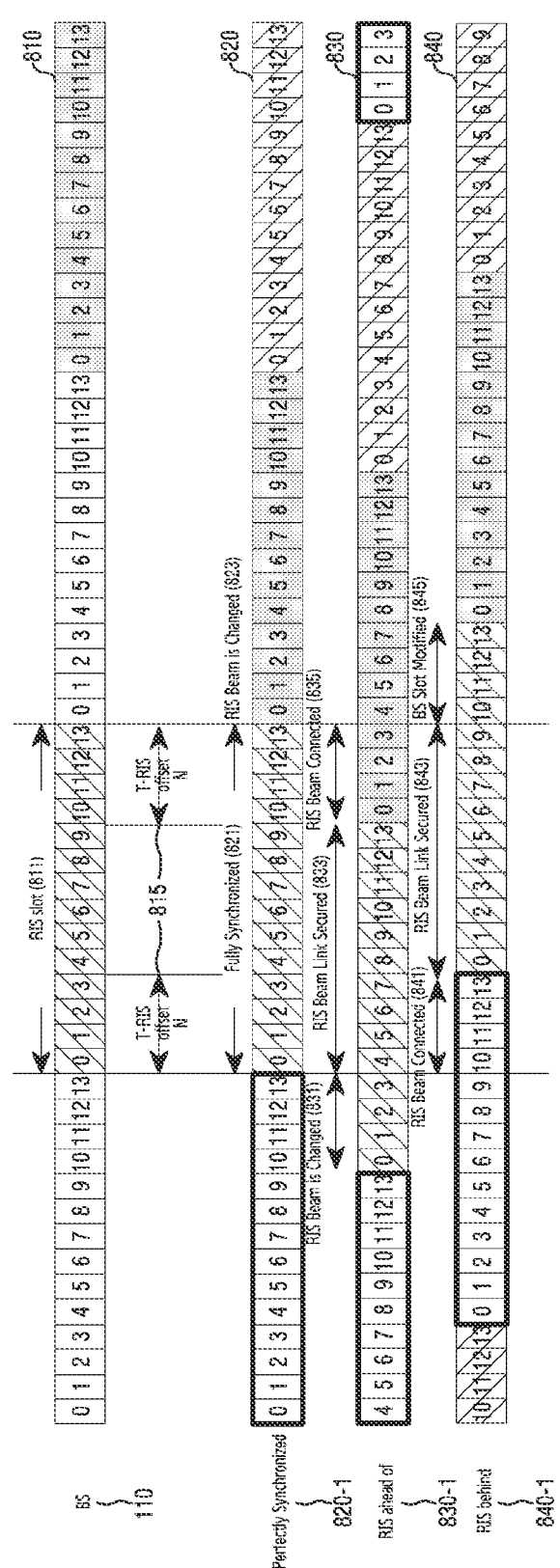
FIG. 8 illustrates data transmission and reception between a base station and a terminal through an offset-based RIS device according to an embodiment.

FIG. 8 illustrates data transmission and reception between a base station and a terminal through an offset-based RIS device according to an embodiment.

Referring to FIG. 8, at least one slot 810 among signals transmitted by the base station 110 may be specified. In the signals reflected by the RIS device 130, one slot may be specified among a slot 820 that is fully synchronized 821 with the at least one slot 810, and one slot may be specified among a slot 820 that has an RIS beam which is changed 823 with the at least one slot 810. In the signals reflected by the RIS device 130 that is ahead of the at least one slot 810, one slot may be specified among a slot 830 that has an RIS beam which is changed 831 and is ahead of the at least one slot 810, one slot may be specified among a slot 830 that has an RIS beam which is changed 833, one slot may be specified among a slot 830 that has an RIS beam which is connected 835 and that is ahead of the at least one slot 810. In the signals reflected by the RIS device 130, one slot may be specified among a slot 840 that has an RIS beam which is connected 841 and that is behind the at least one slot 810, one slot may be specified among a slot 840 that is RIS beam link secured 843 and that is behind the at least one slot 810, and one slot may be specified among a slot 840 that has an RIS beam that is BS slot modified 845 and that is behind the at least one slot 810. The slot 830 that is ahead of the at least one slot 810 and the slot 840 that is behind the at least one slot 810 are due to the RIS device 130 not transmitting and receiving a reference signal or a control signal to/from the base station 110 after the initial configuration of the RIS device 130.

In situation 820-1 illustrated in FIG. 8, the slot 820 that is fully synchronized with at least one slot 810 among signals reflected by the RIS device 130 may be specified. When the slot 820 that is fully synchronized with the at least one slot 810 among signals reflected by the RIS device 130 is specified, the UE 120 may receive all parts (symbol 0, symbol 1, . . . , symbol 13) of one RIS slot 811 by reflecting the signal transmitted from the base station 110 through the RIS device 130.

In situation 830-1 illustrated in FIG. 8, a signal reflected by the RIS device 130 may specify the slot 830 that is ahead of the at least one slot 810. When the signal reflected by the RIS device specifies the slot 830 that is ahead of the at least one slot 810, the UE 120 may receive part (symbol 4, symbol 5, . . . , symbol 13) of one RIS slot 811 by reflecting the signal transmitted from the base station 110 through the RIS device 130. In a case where the UE 120 receives part (symbol 4, symbol 5, . . . , symbol 13) of one RIS slot 811, if the data is also included in the remaining symbols (symbol 0, symbol 1, . . . , symbol 3) except for part of one RIS slot 811, the UE 120 may not receive data included in the remaining symbols (symbol 0, symbol 1, . . . , symbol 3). To solve the problem that the UE 120 may not receive data included in the remaining symbols (symbol 0, symbol 1, . . . , symbol 3), a method is provided for the RIS device 130 to allocate a T-RIS offset 815 within one RIS slot 811. The T-RIS offset 815 may be symbols without data. For example, by allocating the T-RIS offset 815 to the remaining (symbol 0, symbol 1, . . . , symbol 3) symbols, even if the UE 120 may not receive the remaining symbols (symbol 0, symbol 1, . . . , symbol 3), the RIS device 130 may prevent the problem of not receiving data due to no data in the T-RIS offset 815. For example, the T-RIS offset 815 may be allocated by 4 symbols. The T-RIS offset 815 may be allocated to the beginning (symbol 0, symbol 1, . . . , symbol 3) and the end (symbol 10, symbol 11, . . . , symbol 13) of the RIS slot. As illustrated in FIG. 8, the T-RIS offset 815 may be allocated with 4 symbols, but is not limited thereto. The T-RIS offset 815 may be allocated with more than 4 symbols or less than 4 symbols. The T-RIS offset 815 may be initially allocated by the RIS device 130.

In situation 840-1 illustrated in FIG. 8, a signal reflected by the RIS device 130 may specify the slot 840 behind the at least one slot 810. When the signal reflected by the RIS device specifies the slot 840 that is behind at least one slot 810, the UE 120 may receive part (symbol 0, symbol 1, . . . , symbol 9) of one RIS slot 811 by reflecting the signal transmitted from the base station 110 through the RIS device 130. In a case where the UE 120 receives part (symbol 0, symbol 1, . . . , symbol 9) of one RIS slot 811, if the data is also included in the remaining symbols (symbol 10, symbol 11, . . . , symbol 13) except for part of one RIS slot 811, the UE 120 may not receive data included in the remaining symbols (symbol 10, symbol 11, . . . , symbol 13). To solve the problem that the UE 120 may not receive data included in the remaining symbols (symbol 10, symbol 11, . . . , symbol 13), a method is provided in which the RIS device 130 allocates a T-RIS offset 815 within one RIS slot 811. As indicted above, the T-RIS offset 815 may be symbols without data. For example, by allocating the T-RIS offset 815 to the remaining (symbol 0, symbol 1, . . . , symbol 3) symbols, even if the UE 120 may not receive the remaining symbols (symbol 0, symbol 1, . . . , symbol 3), the RIS device 130 may prevent the problem of not receiving data due to no data in the T-RIS offset 815. For example, RIS device 130 allocates 4 symbols to the T-RIS offset 815. The T-RIS offset 815 may be allocated to the beginning (symbol 0, symbol 1, . . . , symbol 3) and the end (symbol 10, symbol 11, . . . , symbol 13) of the RIS slot. As illustrated in FIG. 8, the T-RIS offset 815 may be allocated with 4 symbols, but is not limited thereto. The T-RIS offset 815 may be allocated with more than 4 symbols or less than 4 symbols. According to one embodiment, the T-RIS offset 815 may be initially allocated by the RIS device 130.

Figure 9:
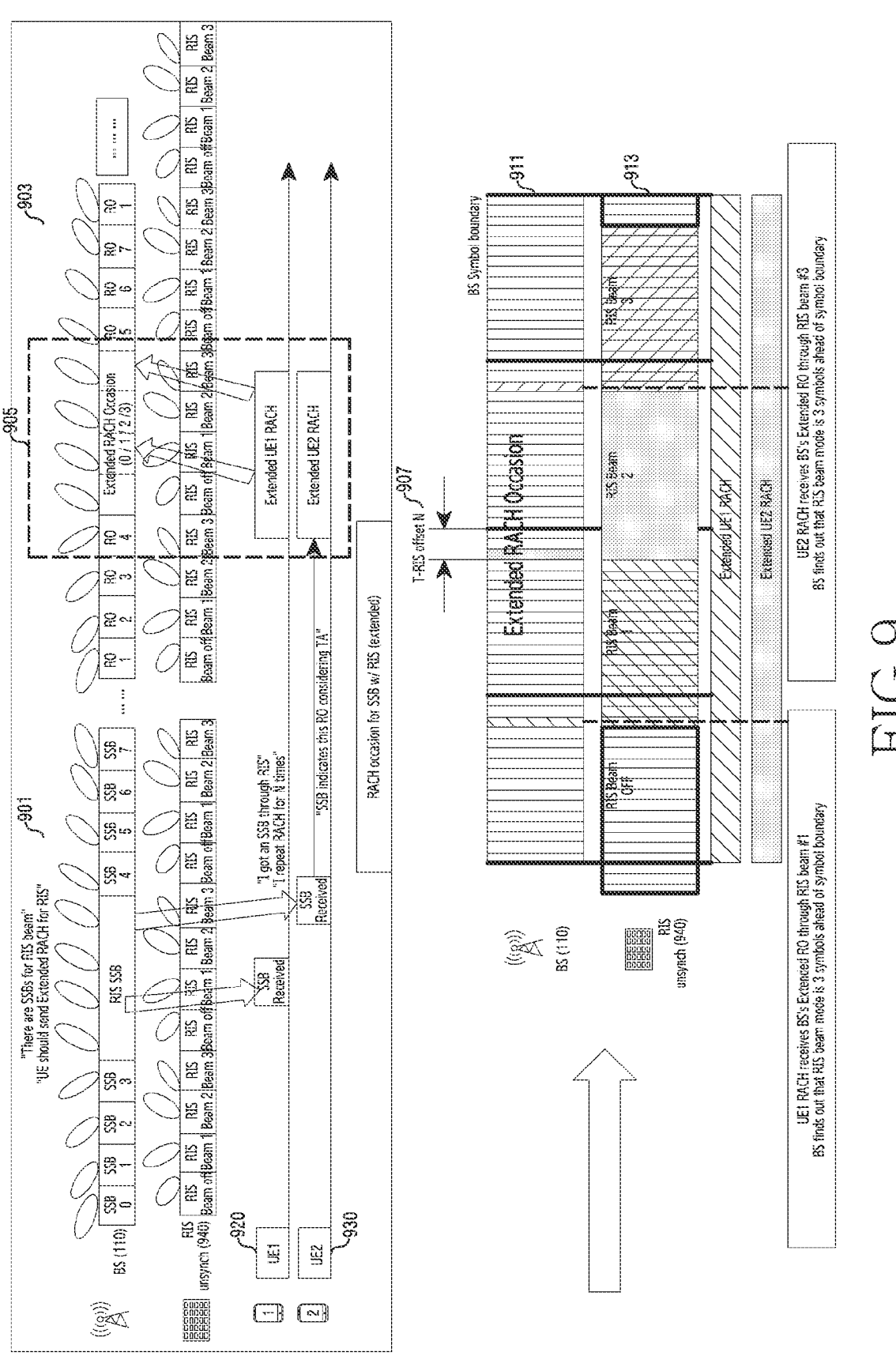
FIG. 9 illustrates data transmission and reception between a base station and a terminal through an offset-based RIS device according to an embodiment.

As illustrated in FIG. 8, a method is provided for transmitting and receiving data by the initially allocated T-RIS offset 815 even when the slot 810 of the base station 110 and the slot 820 or 830 of the RIS device 130 are not synchronized. FIG. 9 describes a method for dealing with a problem in which data may not be transmitted or received because the slot boundary of the base station 110 and the slot boundary of the RIS device 130 do not match through the initial access process.

FIG. 9 illustrates another example of data transmission and reception between a base station and a terminal through an offset-based RIS device according to an embodiment.

Referring to FIG. 9, the base station 110 may receive all of one RIS slot (symbol 0, symbol 1, . . . , symbol 13) by transmitting and receiving signals for initial access with terminal 1 920 or terminal 2 930.

In situation 901 illustrated in FIG. 9, a signal transmitted from the base station 110 among signals for initial access may be a synchronization signal and physical broadcast channel block (SSB). The SSB for initial access repeatedly transmits SSBs with the same index. This is because an out-of-synchronization RIS 940 may not be fully synchronized with the base station 110. Thus, thus an SSB index that is not received may occur if another index is transmitted.

In situation 903 illustrated in FIG. 9, a signal transmitted from the terminal 920 or 930 among signals for initial access may be an RAP transmitted to a RACH occasion allocated through the SSB.

In situation 905 illustrated in FIG. 9, the base station 110 may receive the RAP for the allocated RACH occasion and identify a T-RIS offset 907 based on the received RAP. The T-RIS offset 907 may be a symbol difference between the boundary of the slot 911 and the boundary of the slot 913. Based on the identified T-RIS offset 907, as the base station shares the T-RIS offset 907 with the terminal 920 or 930 as much as the T-RIS offset 907, the terminal 920 or 930 may receive all of one RIS slot through the out-of-synchronization RIS device 940.

As described regarding FIG. 9, a method is provided in which the base station 110 and the terminal 920 or 930 may transmit and receive data through the RIS device 940 by the out-of-synchronization T-RIS offset 815 identified in the initial access process.

Figure 10:
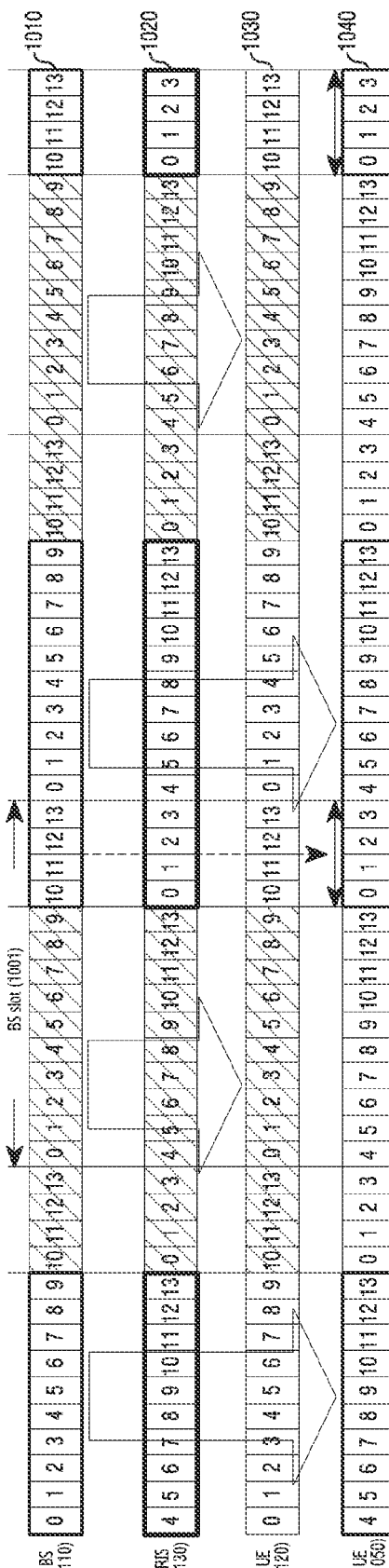
FIG. 10 illustrates data transmission and reception between a base station and a terminal through an offset-based RIS device according to an embodiment.

FIG. 10 describes a method for transmitting and receiving data by another terminal even in a section that is out-of-synchronization.

FIG. 10 illustrates another example of data transmission and reception between a base station and a terminal through an offset-based RIS device according to an embodiment.

FIG. 10 illustrates a slot 1010 of the base station 110, a slot 1020 of the RIS device 130, a slot 1030 of the UE 120 receiving data passing through the RIS device 130, and a slot 1040 of a terminal 1050 unrelated to the RIS device 130.

Among the slots 1010 of the base station 110, one slot 1001 may be divided into symbols (symbol 0, symbol 1, . . . , symbol 9) that may be received by the UE 120 that receives data passing through the RIS device 130 by reflecting the signal transmitted from the base station 110 through the RIS device 130, and symbols (symbols 10, 11, . . . , symbol 13) that may not be received by the UE 120 that receives data passing through the RIS device 130 by reflecting the signal transmitted from the base station 110 through the RIS device 130.

The terminal 1050 unrelated to the RIS device 130 may receive symbols (symbol 10, symbol 11, . . . , symbol 13) that may not be received by the UE 120 receiving data passing through the RIS apparatus 130 by reflection through the RIS apparatus 130. The terminal 1050 unrelated to the RIS device 130 receives symbols (symbols 10, 11, . . . , symbol 13) that may not be received by UE 120, which receives data passing through RIS device 130 by reflection through RIS device 130, so that there is an effect of enabling transmission and reception of data that may not be received through the RIS device 130.

Figure 11:
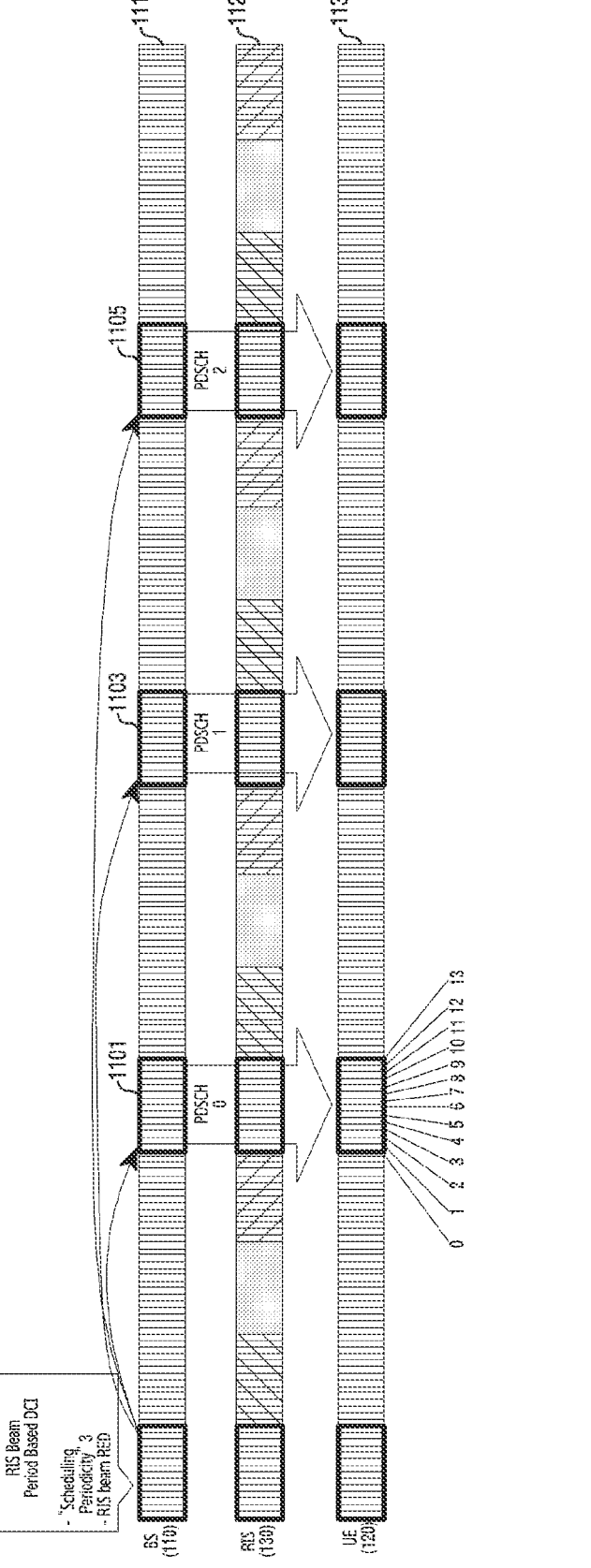
FIG. 11 illustrates data transmission and reception between a base station and a terminal through an RIS device based on an RIS beam period according to an embodiment.

FIG. 11 illustrates data transmission and reception between a base station and a terminal through an RIS device based on an RIS beam period according to an embodiment. FIG. 11 illustrates a method of receiving data based on an RIS beam period.

Referring to FIG. 11, it may be seen that the base station 110 is synchronized with the UE 120, based on the RIS beam period when data is transmitted to the UE 120 through the RIS device 130 that does not transmit/receive a reference signal or a control signal through downlink control information (DCI) with the base station 110. The RIS beam period for the RIS device 130 may be preconfigured in the base station 110.

After configuring the RIS beam period, the base station 110 calculates the number of physical downlink shared channel (PDSCH)f transmissions, based on the configured RIS beam period. After calculating the number of PDSCH transmissions, the base station 110 inputs the number of repetitions through DCI. After the base station 110 inputs the number of repetitions through the DCI, the DCI corresponding to the number of repetitions is transmitted to the UE 120 through the RIS device 130. The UE 120 receives the DCI through the RIS device 130, based on the DCI corresponding to the corresponding repetition number transmitted from the base station 110 and, based on this, receives the PDSCH corresponding to the corresponding repetition number.

When the UE 120 identifies that the PDSCH has not been received for the corresponding number of repetitions, it may be that a beam failure (link failure) has occurred. When the UE 120 identifies that the PDSCH has not been received for the corresponding number of repetitions, a beam search operation should be performed again.

FIG. 12 illustrates information included in a PBCH according to an embodiment.

Referring to FIG. 12, the base station 110 may transmit the PBCH, and the PBCH may include 6 bits (6 most significant bits (MSBs)) of system frame number (SFN), 1 bit of sub carrier spacing (SCS) for common control, 4 bits of SS/PBCH subcarrier offset, four bits of SS/PBCH subcarrier offset, 8 bits of demodulation reference signal (DMRS) type A position for PDSCH, 1 bit of SIB1 physical downlink control channel (PDCCH) configuration, 1 bit of Cell barring information, 1 bit of intra-frequency reselection, and 1 bit of spare bit. That is, the PBCH may optionally include 1 bit more than 23 bits in NR.

The PBCH transmitted from the base station 110 may further include 4 bits of SFN, 4 bits of last significant bits (LSBs), 3 bits of MSB of SS/PBCH block index, and 1 bit of half frame timing in addition to 23 bits+1 bit (optional) when the frequency band is greater than 6 GHz in the additional payload of NR.

The PBCH transmitted from the base station 110 may further include 4 bits of SFN, 4 bits of LSBs, 1 bit of half frame timing, and 3 bits of MSB of SS/PBCH subcarrier offset in addition to 23 bits+1 bit (optional) when the frequency band is 3 GHz-6 GHz in the additional payload of NR.

The PBCH transmitted from the base station 110 may further include 4 bits of SFN, 4 bits of LSBs, and 1 bit of SS/PBCH subcarrier offset in addition to 23 bits+1 bit (optional) when the frequency band is less than 3 GHz in the additional payload of NR.

The PBCH transmitted from the base station 110 may further include RIS device information in addition to 23 bits+1 bit (optional) 1201. Specifically, the information on the RIS device 1201 may further include a T-RIS index 1203 3 bits 1205, a half frame timing 1 bit 1207, and an RIS indicator 1209 1 bit in Spare. That is, the PBCH may further include 8 bits 1211 to the existing 24 bits in NR.

The T-RIS index 1203 may indicate information on whether the UE 120 received data transmitted from the base station 110 through which RIS device among a plurality of RIS devices in one cell.

The RIS indicator 1209 may indicate whether data transmitted from the base station 110 is transmitted to the UE 120 through the RIS device.

Figure 13:
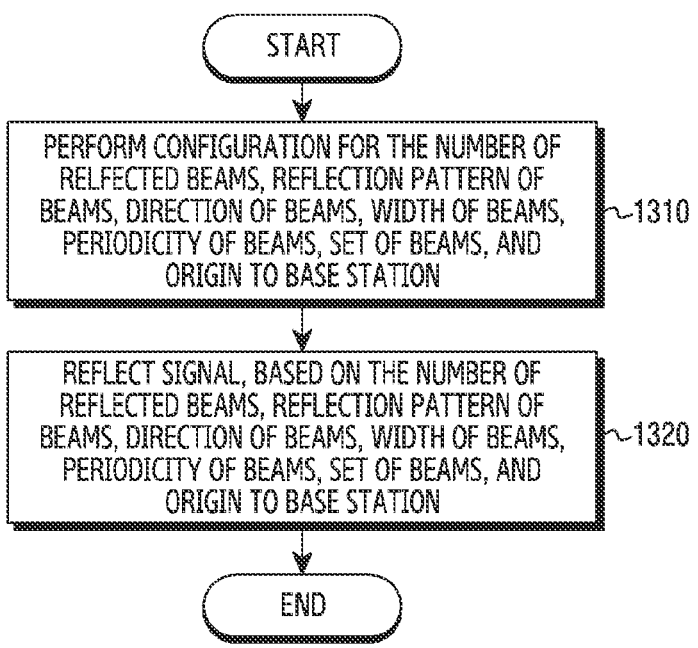
FIG. 13 illustrates a flowchart for initial configuration between an RIS device and a base station according to an embodiment.

FIG. 13 illustrates a flowchart for initial configuration between an RIS device and a base station according to an embodiment.

In step 1310 of FIG. 13, the RIS device 130 may perform initial configuration for a plurality of beams. The initial configuration for the plurality of beams may include configurations related to a number of reflected beams, a reflection pattern of the beams, a direction of the beams, a width of the beams, a periodicity of the beams, a set of the beams, and an origin to the base station. The reflection pattern of the beam may be a reflection pattern related to an amplitude of a signal reflected by the RIS device. The reflection pattern of the beam may be a reflection pattern related to a phase of a signal reflected by an RIS device. The configurations for the beams may be fixed after initial configurations. That is, because the RIS device 130 does not transmit/receive a reference signal or a control signal with the base station 110, the configurations regarding beams may be fixed after initial configurations.

In step 1320 of FIG. 13, the RIS device 130 may reflect a signal, based on an initial configuration information on the beam to the base station 110. The signal may be a downlink signal transmitted from the base station 110 to the UE 120. The signal may be an uplink signal transmitted from the UE 120 to the base station 110. The initial configuration information on the beams may include information on configuration about the number of reflected beams, the reflection pattern of beams, the direction of beams, the width of beams, the periodicity of beams, the set of beams, and the origin to the base station. The base station 110 may transmit and receive data to/from the terminal through the RIS device, based on initial configuration information configured in the RIS device 130. The received initial configuration information may be a fixed configuration.

Figure 14:
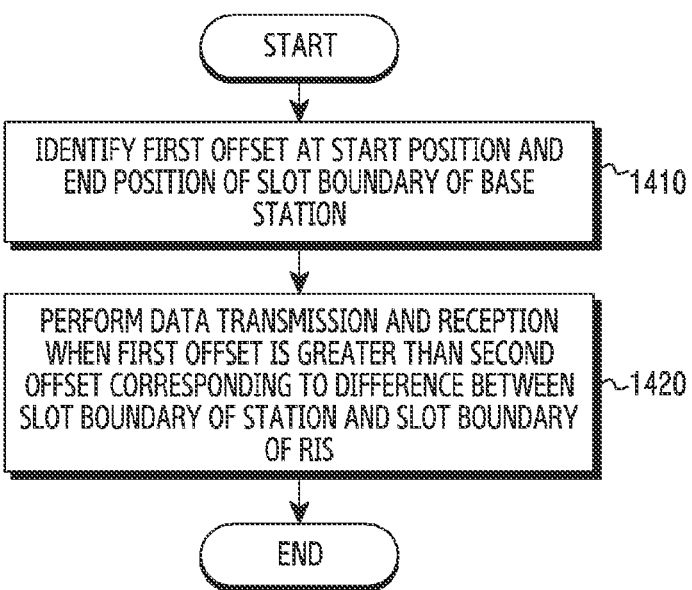
FIG. 14 illustrates a flowchart for data transmission and reception between a base station and a terminal through an offset-based RIS device according to an embodiment.

FIG. 14 illustrates a flowchart for data transmission and reception between a base station and a terminal through an offset-based RIS device according to an embodiment.

In step 1410 of FIG. 14, a first offset is identified at a start position and an end position of a slot boundary of the base station. The first offset may be the T-RIS offset 815 (FIG. 8). Synchronization between the RIS device 130 and the base station 110 may not match. Thus, the slot boundary of the RIS device 130 may be behind or ahead of the slot boundary of the base station 110. The first offset may be configured to solve a problem that data included in some symbols may not be received when the slot boundary of the RIS device 130 is behind or ahead of the slot boundary of the base station 110. The first offset may be initially allocated, and may not include data.

In step 1420 of FIG. 14, the difference between the slot boundary of the actual base station 110 and the slot boundary of the RIS device 130 may be referred to as a second offset. That is, the second offset may be a symbol difference between the slot boundary of the base station 110 and the slot boundary of the RIS device 130. When the first offset is greater than or equal to the second offset, because the first offset does not include data, the UE 120 may receive all data included in the signal transmitted from the base station 110 through the RIS device 130.

Figure 15:
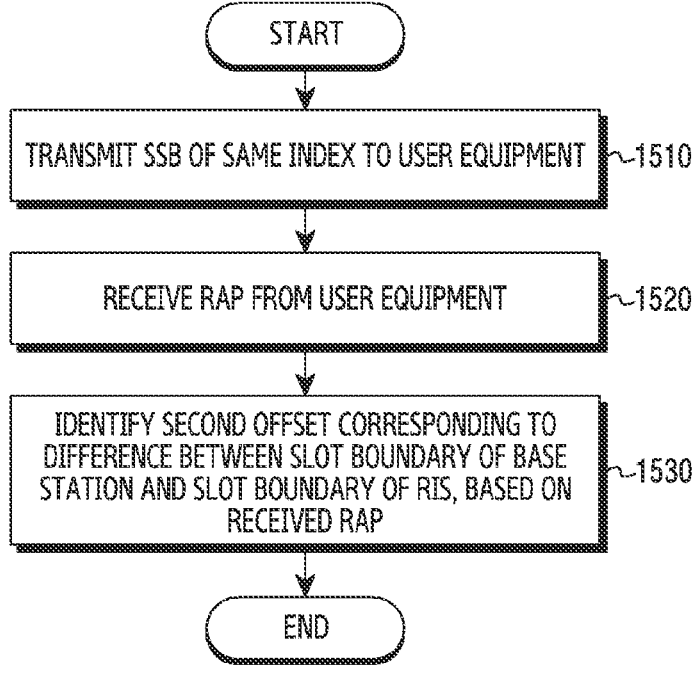
FIG. 15 illustrates a flow chart for data transmission and reception between a base station and a terminal through an offset-based RIS device according to an embodiment.

FIG. 15 illustrates another flow chart for data transmission and reception between a base station and a terminal through an offset-based RIS device according to an embodiment.

In step 1510 of FIG. 15, the base station 110 may transmit an SSB to the UE 120 through the RIS device 130. The SSB for initial access repeatedly transmit SSBs with the same index, since the RIS device 130 may not be fully synchronized with the base station 110. Thus, when another index is transmitted, an SSB index that is not received may occur.

In step 1520 of FIG. 15, the base station 110 may receive an RAP from the UE 120 through the RIS device 130. The RAP may be received on an RACH occasion allocated through the SSB.

In step 1530 of FIG. 15, the base station 110 may identify a second offset, based on the received RAP. The offset may be T-RIS offset 907 (FIG. 9). The second offset may be a symbol difference between the boundary of the slot 911 and the boundary of the slot 913. Based on the identified second offset, the base station 110 may share the second offset with the UE 120 as much as the second offset, so that the UE 120 may receive all of one RIS slot through the RIS device 130.

Figure 16:
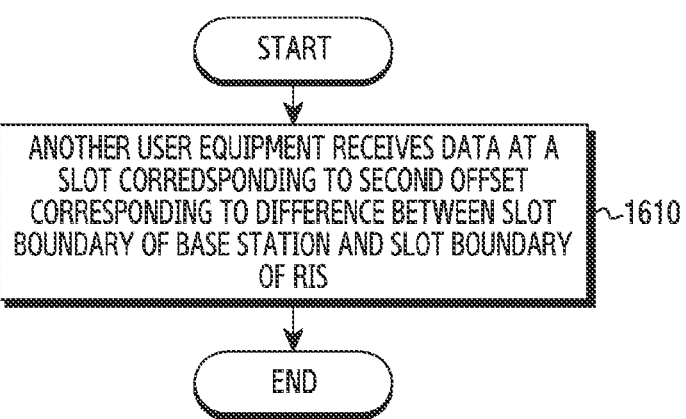
FIG. 16 illustrates a flow chart for data transmission and reception between a base station and a terminal through an offset-based RIS device according to an embodiment.

FIG. 16 illustrates another flow chart for data transmission and reception between a base station and a terminal through an offset-based RIS device according to an embodiment.

In step 1610 of FIG. 16, when the UE 120 receives data transmitted from the base station 110 through the RIS device 130, the UE 120 may not receive data corresponding to a second offset. In this case, another terminal 1050 unrelated to the RIS device 130 may receive data corresponding to the second offset.

In a method performed by a RIS device in a wireless communication system according to an embodiment, to number of fixed beams for a beam is configured, a fixed reflection pattern for the beam is configured, and a fixed period for the beam is configured. A signal is reflected, based on the number of fixed beams, the fixed reflection pattern, and the fixed period, and the fixed reflection pattern is related to an amplitude and a phase of the signal reflected by the RIS device.

In case that a first offset that does not include data, identified at the start position and the end position of a slot boundary of the base station, that is greater than a second offset corresponding to a difference between the slot boundary of the base station and a slot boundary of the RIS device, the base station transmits data to a user equipment and receives data from the user equipment through the RIS device.

The second offset may be identified based on an SSB transmitted to the terminal through the RIS device and a RAP transmitted to the base station through the RIS device. After the second offset is identified, the base station may perform data transmission and reception with the terminal through the RIS device.

The terminal and another terminal may receive the data transmitted from the base station within the difference between the slot boundaries.

The RIS device may be identified by the RIS index, and the RIS index may be included in a master information block transmitted from the base station.

In a method performed by the base station in a wireless communication system according to an embodiment, the method includes identifying the number of fixed beams for a beam, a fixed reflection pattern for the beam, and a fixed period for the beam regarding an RIS device, and transmitting or receiving signals in consideration of the RIS, based on the number of fixed beams for a beam, a fixed reflection pattern for the beam, and a fixed period for the beam, and the fixed reflection pattern may be related to an amplitude and a phase of the signal reflected by the RIS device.

In an RIS device in a wireless communication system according to an embodiment, the RIS device may include an RIS element (RE), and an RIS controller (RC) coupled to the RIS, wherein the RC may be configured to configure the number of fixed beams for a beam, a fixed reflection pattern for the beams, and a fixed period for the beams, and reflect a signal, based on the number of fixed beams, the fixed reflection pattern, and the fixed period, and wherein the fixed reflection pattern may be related to an amplitude and a phase of the signal reflected by the RIS device.

In a base station in a wireless communication system according to an embodiment, the base station includes a transceiver, and at least one processor coupled to the transceiver, wherein the at least one processor may be configured to identify the number of fixed beams for a beam, a fixed reflection pattern for the beams, and a fixed period for the beams regarding an RIS device, and transmit or receive signals in consideration of the RIS, based on the number of fixed beams for a beam, the fixed reflection pattern for the beam, and the fixed period for the beams, and wherein the fixed reflection pattern is related to an amplitude and a phase of the signal reflected by the RIS device.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A method performed by a reconfigurable intelligent surface (RIS) device in a wireless communication system, the method comprising:

configuring a number of fixed beams for a beam, a fixed reflection pattern for the beam, and a fixed period for the beam; and reflecting a signal based on the number of the fixed beams, the fixed reflection pattern, and the fixed period, wherein the fixed reflection pattern is related to an amplitude and a phase of the reflected signal, and wherein, in case that a first offset is greater than a second offset corresponding to a difference between a slot boundary of a base station and a slot boundary of the RIS device, data is transmitted and received between a user equipment and the base station through the RIS device.

2. The method of claim 1, wherein the first offset is identified at a start position and an end position of the slot boundary of the base station, and wherein the first offset does not include the data.

3. The method of claim 1, wherein the second offset is identified based on a synchronization signal and physical broadcast channel block transmitted to the user equipment through the RIS device and a random access preamble transmitted to the base station through the RIS device, and wherein, after the second offset is identified, the base station performs data transmission and reception with the user equipment through the RIS device.

4. The method of claim 1, wherein the user equipment and another user equipment receive the data transmitted from the base station within the difference between the slot boundary of the base station and the slot boundary of the RIS device.

5. The method of claim 1, wherein the RIS device is identified by an RIS index, and wherein the RIS index is included in a master information block transmitted from the base station.

6. A method performed by a base station in a wireless communication system, the method comprising:

identifying a number of fixed beams for a beam, a fixed reflection pattern for the beam, and a fixed period for the beam regarding a reconfigurable intelligent surface (RIS) device; and at least one of transmitting and receiving a signal based on the RIS, the number of fixed beams, the fixed reflection pattern, and the fixed period, and transmitting data to a user equipment through the RIS device in case that a first offset is greater than a second offset corresponding to a difference between a slot boundary of the base station and a slot boundary of the RIS device, wherein the fixed reflection pattern is related to an amplitude and a phase of the reflected signal.

7. The method of claim 6, wherein the first offset is associated with a start position and an end position of a slot boundary of the base station, and wherein the first offset does not include the data.

8. The method of claim 6, wherein the second offset is identified based on a synchronization signal and physical broadcast channel block transmitted to the user equipment through the RIS device and a random access preamble transmitted to the base station through the RIS device, and wherein, after the second offset is identified, the data is transmitted to the user equipment through the RIS device.

9. The method of claim 6, wherein the user equipment and another user equipment receive the data transmitted from the base station within the difference between the slot boundary of the base station and the slot boundary of the RIS device.

10. The method of claim 6, wherein the RIS device is identified by the RIS index, and wherein the RIS index is included in a master information block transmitted from the base station.

11. A reconfigurable intelligent surface (RIS) device in a wireless communication system, the RIS device comprising:

an RIS element; and an RIS controller (RC) coupled to the RIS element, wherein the RC is configured to:

configure a number of fixed beams for a beam, a fixed reflection pattern for the beam, and a fixed period for the beam, and reflect a signal based on the number of the fixed beams, the fixed reflection pattern, and the fixed period, wherein the fixed reflection pattern is related to an amplitude and a phase of the reflected signal, and wherein, in case that a first offset is greater than a second offset corresponding to a difference between a slot boundary of a base station and a slot boundary of the RIS device, data is transmitted and received between a user equipment and the base station through the RIS device.

12. The RIS device of claim 11, wherein the first offset is identified at a start position and an end position of the slot boundary of the base station, and wherein the first offset does not include the data.

13. The RIS device of claim 11, wherein the second offset is identified based on a synchronization signal and physical broadcast channel block transmitted to the user equipment through the RIS device and a random access preamble transmitted to the base station through the RIS device, and wherein, after the second offset is identified, the base station performs data transmission and reception with the user equipment through the RIS device.

14. The RIS device of claim 11, wherein the user equipment and another user equipment receive the data transmitted from the base station within the difference between the slot boundary of the base station and the slot boundary of the RIS device.

15. The RIS device of claim 11, wherein the RIS device is identified by an RIS index, and wherein the RIS index is included in a master information block transmitted from the base station.

16. A base station in a wireless communication system, the base station comprising:

at least one transceiver;

at least one processor communicatively coupled to the at least one transceiver; and at least one memory, communicatively coupled to the at least one processor, storing instructions executable by the at least one processor individually or in any combination to cause the base station to:

identify a number of fixed beams for a beam, a fixed reflection pattern for the beam, and a fixed period for the beam regarding a reconfigurable intelligent surface (RIS) device, at least one of transmit and receive a signal based on the RIS, the number of fixed beams, the fixed reflection pattern, and the fixed period, and transmit data to a user equipment through the RIS device when a first offset is greater than a second offset corresponding to a difference between a slot boundary of the base station and a slot boundary of the RIS device, wherein the fixed reflection pattern is related to an amplitude and a phase of the reflected signal.

17. The base station of claim 16, wherein the first offset is associated with a start position and an end position of the slot boundary of the base station, and wherein the first offset does not include the data.

18. The base station of claim 16, wherein the second offset is identified based on a synchronization signal and physical broadcast channel block transmitted to the user equipment through the RIS device and a random access preamble transmitted to the base station through the RIS device, and wherein the at least one processor, after the second offset is identified, is configured to transmit data to a user equipment through the RIS device.

19. The base station of claim 16, wherein the user equipment and another user equipment receive the data transmitted from the base station within the difference between the slot boundary of the base station and the slot boundary of the RIS device.

20. The base station of claim 16,
wherein the RIS device is identified by the RIS index, and
wherein the RIS index is included in a master information
  block transmitted from the base station.

\* \* \* \* \*